(12) United States Patent
Solhusvik et al.

(10) Patent No.: US 12,604,117 B2
(45) Date of Patent: Apr. 14, 2026

(54) IMAGE ELEMENT READOUT CIRCUITRY, IMAGE ELEMENT, AND IMAGE ELEMENT READOUT METHOD

(71) Applicant: Sony Semiconductor Solutions Corporation, Atsugi (JP)

(72) Inventors: Johannes Solhusvik, Stuttgart (DE); Yorito Sakano, Stuttgart (DE)

(73) Assignee: SONY SEMICONDUCTOR SOLUTIONS CORPORATION, Atsugi (JP)

( * ) Notice: Subject to any disclaimer, the term of this patent is extended or adjusted under 35 U.S.C. 154(b) by 278 days.

(21) Appl. No.: 18/283,554

(22) PCT Filed: Mar. 21, 2022

(86) PCT No.: PCT/EP2022/057278
§ 371 (c)(1),
(2) Date: Sep. 22, 2023

(87) PCT Pub. No.: WO2022/207381
PCT Pub. Date: Oct. 6, 2022

(65) Prior Publication Data
US 2024/0171882 A1      May 23, 2024

(30) Foreign Application Priority Data

Mar. 31, 2021     (EP) .................................... 21166291

(51) Int. Cl.
*H04N 25/78*          (2023.01)
*H04N 25/533*         (2023.01)
(52) U.S. Cl.
CPC ........... *H04N 25/78* (2023.01); *H04N 25/533* (2023.01)

(58) Field of Classification Search
None
See application file for complete search history.

(56) References Cited

U.S. PATENT DOCUMENTS

| | | | |
|---|---|---|---|
| 7,038,820 B1 | 5/2006 | Kindt et al. | |
| 2007/0158771 A1* | 7/2007 | Hynecek | ............... H10F 39/011 257/431 |

(Continued)

FOREIGN PATENT DOCUMENTS

| | | |
|---|---|---|
| EP | 3001458 A1 | 3/2016 |
| WO | 01/76228 A1 | 10/2001 |
| WO | 2020/252592 A1 | 12/2020 |

OTHER PUBLICATIONS

Yasuda et al., "Variable-integration-time image sensor for wide dynamic range", Available Online At: https://www.design-reuse.com/articles/7411/variable-integration-time-image-sensor-for-wide-dynamic-range.html, Retrieved from Internet on: Feb. 8, 2021, pp. 1-8.

(Continued)

*Primary Examiner* — Mark T Monk
(74) *Attorney, Agent, or Firm* — XSENSUS LLP

(57) ABSTRACT

The present disclosure generally pertains to image element readout circuitry configured to: sense an amount of electric carriers in a photosensitive element, wherein the photosensitive element is configured to generate the electric carriers in response to light being incident on the photosensitive element; and read the electric carriers from the photosensitive element when the amount of electric carriers has reached a predetermined value.

20 Claims, 11 Drawing Sheets

(56) References Cited

U.S. PATENT DOCUMENTS

| | | |
|---|---|---|
| 2013/0293752 A1 | 11/2013 | Peng et al. |
| 2019/0082125 A1 | 3/2019 | Smith et al. |
| 2020/0007804 A1 | 1/2020 | Guidash et al. |
| 2020/0045250 A1 | 2/2020 | Geurts |

OTHER PUBLICATIONS

International Search Report and Written Opinion mailed on Jun. 21, 2022, received for PCT Application PCT/EP2022/057278, filed on Mar. 21, 2022, 10 pages.

\* cited by examiner

50

Reset PD, pre-charge
sense node to Vref
and set i to zero 51

Turn off reset switch
52

Integrate light 53

Increment i 54

Measure sense node
voltage 55

Compare
voltages 56

Read out PD 57

V_precharge - ΔV_th

120

Sense amount of
electric carriers
121

Read electric car-
riers 122

130

131

IMAGE ELEMENT READOUT CIRCUITRY, IMAGE ELEMENT, AND IMAGE ELEMENT READOUT METHOD

CROSS-REFERENCE TO RELATED APPLICATIONS

The present application is based on PCT filing PCT/EP2022/057278, filed Mar. 21, 2022, and claims priority from European Patent Application No. 21166291.1, filed Mar. 31, 2021, the entire contents of each are incorporated herein by reference.

TECHNICAL FIELD

The present disclosure generally pertains to image element readout circuitry, an image element, and an image element readout method.

TECHNICAL BACKGROUND

Generally, methods for reading charges generated in photodiodes (e.g. in a camera) are known.

After a predetermined exposure time, an (electric) shutter may be used, such that no more charges are generated in the photodiode after the exposure time has expired. The exposure time may be set automatically or based on a user preference.

In such devices and methods, the generated charges are drained from the photodiode and cannot be restored, such that such methods may be referred to as destructive readout methods.

Non-destructive readout methods are also known. For example, a parasitic capacitance between the photodiode and a deep trench isolation (DTI) may be utilized to sense the photodiode charge in order to determine a readout time point, which will be discussed under reference of FIG. 1.

Although there exist techniques for reading out photodiodes, it is generally desirable to provide image element readout circuitry, an image element, and an image element readout method.

SUMMARY

According to a first aspect, the disclosure provides image element readout circuitry configured to:

sense an amount of electric carriers in a photosensitive element, wherein the photosensitive element is configured to generate the electric carriers in response to light being incident on the photosensitive element; and read the electric carriers from the photosensitive element when the amount of electric carriers has reached a predetermined value.

According to a second aspect, the disclosure provides an image element comprising:

a photosensitive element; and image element readout circuitry configured to:

sense an amount of electric carriers in the photosensitive element, wherein the photosensitive element is configured to generate the electric carriers in response to light being incident on the photosensitive element; and read the electric carriers from the photosensitive element when the amount of electric carriers reached a predetermined value.

According to a third aspect, the disclosure provides an image element readout method comprising:

sensing an amount of electric carriers in a photosensitive element, wherein the photosensitive element is configured to generate the electric carriers in response to light being incident on the photosensitive element; and reading the electric carriers from the photosensitive element when the amount of electric carriers has reached a predetermined value.

Further aspects are set forth in the dependent claims, the following description and the drawings.

BRIEF DESCRIPTION OF THE DRAWINGS

Embodiments are explained byway of example with respect to the accompanying drawings, in which.

DETAILED DESCRIPTION OF EMBODIMENTS

Figure 2:
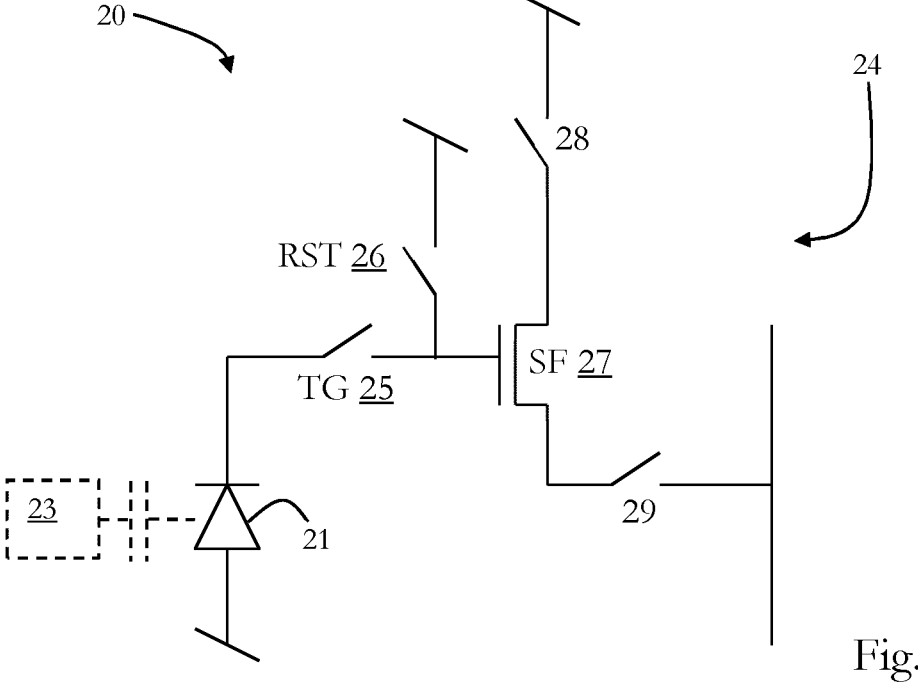
FIG. 2 depicts a circuit diagram of an image element according to the present disclosure including image element readout circuitry according to the present disclosure.

Before a detailed description of the embodiments starting with FIG. 2 is given, general explanations are made.

As mentioned in the outset, non-destructive pixel readout methods are generally known.

However, it has been recognized that it is desirable to provide downwards scalability of pixels, such that a high resolution can be achieved at a low-cost, for example in the case of CMOS (complementary metal oxide semiconductor) image sensors with a high dynamic range (HDR).

Known HDR pixels (e.g. DCG (dual conversion gain), split PD (photodiode), LOFIC (lateral overflow integration capacitor), or the like) may be challenging to scale below approximately two micrometers since a photodiode may become too small to have a sufficient low-light performance.

Hence, it has been recognized that it may be suitable to decrease a size of readout circuitry.

It has further been recognized that ultra-high-resolution HDR sensors which combine (or bin) neighboring pixels may have a high manufacturing complexity and thus, a high cost.

Moreover, known CMOS image sensor pixel may use correlated double sampling (CDS) for reading or sensing accumulated signal charges in a photodiode, thus creating a proportional output voltage.

However, CDS readout is typically destructive, i.e. there is no more charge left in the photodiode after the sensing is completed. Furthermore, a new integration process for photo charge may be carried out before each readout.

Hence, it has been recognized that it is desirable to provide an automatic control for integration time on each pixel (or group of pixels) according to a light level in the pixel(s), e.g. based on non-destructive pixel-readout, and thereby also increasing a dynamic range of an image sensor.

However, in known pixels, non-destructive pixel-readout may be achieved by providing a deep trench isolation (DTI), which increases a manufacturing cost.

Figure 1:
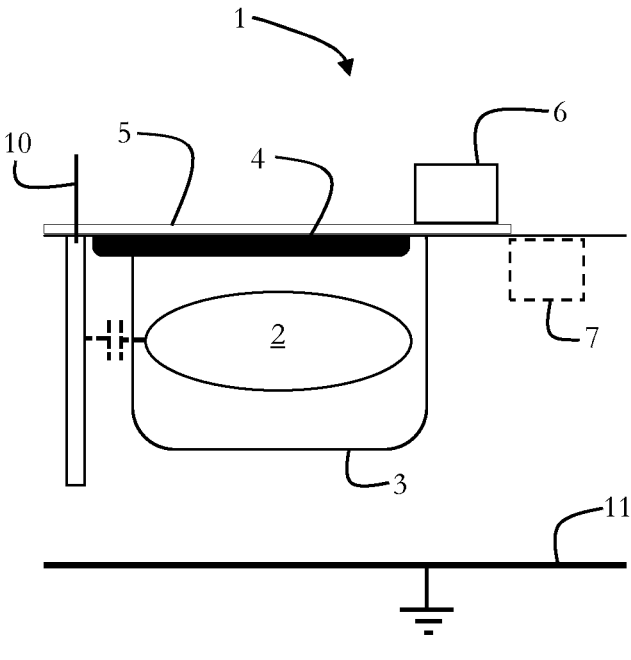
FIG. 1 depicts a pixel as it is generally known.

Non-destructive readout as it is generally known is discussed under reference of FIG. 1 depicting a pixel 1.

In the pixel 1, a photodiode 2 is embedded into an N-well of a semiconductor material 3.

The pixel 1 further includes a pinning layer 4 underneath a silicon dioxide dielectric layer 5, a transfer gate 6, and a floating diffusion 7, as it is generally known.

Moreover, a DTI 8 is provided including a metal fill which is coupled to the photodiode 2 via a sensing transistor 9, such that a parasitic capacitance between the photodiode and the DTI can be used to determine a voltage change in the photodiode by a sensing circuit 10, which is connected to the DTI 8. The pixel 1 is provided on a p-sup layer 11, as it is generally known.

However, it has been recognized that in terms of (downwards) scalability and manufacturing costs, it may be desirable to avoid using a DTI.

Therefore, some embodiments pertain to image element readout circuitry configured to: sense an amount of electric carriers in a photosensitive element, wherein the photosensitive element is configured to generate the electric carriers in response to light being incident on the photosensitive element; and read the electric carriers from the photosensitive element when the amount of electric carriers has reached a predetermined value.

Circuitry may pertain to any entity or multitude of entities which is adaptable to sense and/or read electric carriers according to the present disclosure and/or which is configurable to generate control signals for sensing and/or reading electric carriers, such as a CPU (central processing unit), GPU (graphics processing unit), FPGA (field-programmable gate array), or the like.

The image element readout circuitry may be provided in or for an image element, which may be based on known (semiconductor) technologies, such as CMOS (complementary metal oxide semiconductor), or the like.

Hence, the image element may include a photosensitive element which, when light is incident on the photosensitive element, is configured to generate electric carriers, as it is generally known. The photosensitive element may be based on a photodiode, for example.

Accordingly, the electric carriers may be any electric carriers generated in a photodetection process, such as electrons, electron-hole-pairs, holes, or the like.

The electric carriers may be sensed, after they are generated, as being present in the photosensitive element, for example as a charge, a voltage, a current, or the like (which will be discussed further below). As it is generally known in the field of imaging, charges are typically read from the image element or from the photosensitive element after a predetermined amount of exposure time.

However, according to the present disclosure, the charges are read from the photosensitive element when it is sensed that the amount of electric carriers in the photosensitive element has reached a predetermined value.

For example, if the exposure time is too long or too short in known imaging devices, a resulting image may be over-exposed or under-exposed since it is not determined at which point of time it is sensible to read the electric carriers.

Thus, according to the present disclosure, the charges may only be read when the photosensitive element has been sufficiently exposed with light, but not too much, such that an over- or under-exposure may be avoided.

The predetermined value may be any value and may depend on how the amount of electric carriers is sensed. For example, it may be a relative value (e.g. between zero and one or zero and a hundred percent, such as twenty percent, fifty percent, seventy percent, or the like) or an absolute value.

For example, the amount of electric carriers may be sensed based on capacitive sensing in which case the predetermined value may have the dimension of a charge, for example.

Accordingly, the amount of electric carriers may be sensed as an absolute amount of, for example, electrons, or as a charge or may be sensed based on any other indirect or direct way.

Hence, according to the present disclosure, a non-destructive sensing of the electric carriers in the photosensitive element during an image capture process is achieved. Thus, a pixel-individual integration time can be provided, thereby further increasing a dynamic range of an image sensor (in case of multiple pixels or image elements) and a signal to noise ratio (e.g. by averaging multiple read operations). Non-destructive readout according to the present disclosure may also be used to multi-sample an image element or pixel to measure a rate of change of a signal, thus further increasing a dynamic range. Furthermore, per pixel A/D (analog/digital) conversion may be provided, e.g., by measuring a time (by a respective clock) for a pixel to reach a certain signal threshold level. Moreover, according to the present disclosure, image element readout circuitry may be provided which may be applied to a back-side illuminated image sensor as well as to a front-side illuminated image sensor.

In some embodiments, the amount of electric carriers in the photosensitive element is sensed based on capacitive sensing, as discussed above.

A parasitic capacitance with respect to the photosensitive element may be used for sensing the amount of electric carriers. For example, a parasitic capacitance may be present since charged elements (e.g. the photodiode) and a further element have a known distance (known due to manufacturing, for example), such that they may be modelled as a capacitor, as it is generally known. The parasitic capacitance may thus be indicative of the charges or electric carriers being present in the photosensitive element.

Accordingly, in some embodiments, the image element readout circuitry is further configured to: capacitively sense a voltage change in the photosensitive element which is indicative of the amount of electric carriers in the photosensitive element. For example, capacitive sensing may be envisaged, such that, based on a parasitic capacitance between the photodiode and a further element (e.g. a reference voltage node, ground, a pinning layer, a transfer gate, a floating diffusion, a laminating layer, a semiconductor layer, a doped region, or the like), the amount of electric carriers in the photosensitive element may be determined.

The voltage change may be a voltage drop or a voltage rise which may be proportional to the amount of electric carriers (accumulated from photons) in the photosensitive element or wherein any other mathematic relation may be determinable.

In some embodiments, the amount of electric carriers (or photodiode charge) is further sensed by capacitively sensing a voltage with respect to a reference voltage (or ground). For example, the parasitic capacitance between the photosensitive element and reference voltage (or ground) may be used to sense electric carriers in the photosensitive element.

Hence, a capacitive sensing circuit or a sense node may be provided between ground and the capacitor. Based on this, for example, the voltage change may be determined.

In some embodiments, the amount of electric carriers is further sensed based on a capacitive coupling between a transfer gate and the photosensitive element.

A transfer gate may be provided in the image element, as it is generally known and thus, a capacitive sensing circuit may be coupled to the transfer gate. For example, based on such a configuration, a parasitic capacitance between the photosensitive element and the transfer gate may be used to sense the amount of electric carriers in the photosensitive element, as discussed herein.

In some embodiments, the amount of electric carriers is further sensed based on a capacitive coupling between a pinning layer and the photosensitive element.

As it is generally known, a pinning layer may be provided in an image element and thus, it may be capacitively coupled with the photosensitive element, such that it may enable sensing of the photodiode charge, e.g. based on a sensing of a voltage change, or the like.

Hence, in some embodiments a voltage change may be determined based on a capacitive coupling, as discussed herein.

In some embodiments, the amount of electric carriers is sensed based on threshold voltage modulation sensing (also referred to as Vth modulation sensing).

As it is generally known, Vth modulation sensing may use an adaptive sensing voltage for sensing electric carriers. The applied voltage of a sensing node or sense circuit may change with respect to the electric carriers being present in the photosensitive element, such that the amount of electric carriers in the photosensitive element is sensed based on the voltage (change). Such voltage change will result in Vth modulation which can be translated into a corresponding photodiode charge.

As discussed herein, when the amount of electric carriers has reached a predetermined value, the electric carriers are read from the photosensitive element (for generating an imaging signal).

In some embodiments, the electric carriers are read from the photosensitive element based on correlated double sampling.

Correlated double sampling (CDS) is generally known, such that an extensive discussion thereof is omitted. However, it should be noted that the present disclosure is not limited to any type of CDS, such that analog or digital CDS may be envisaged. By using CDS, a signal to noise ratio may further be optimized.

In the case that multiple image elements are used (e.g. in a pixel array), after the CDS readout, each pixel value may be linearized (or normalized), e.g. by dividing the pixel value by the integration time. For example, different pixels may need different integration times until they reach the predetermined value, but if they are not linearized, they may be differently exposed, such that a color distribution in the image may be deteriorated.

Moreover, in the case of multiple pixels, each pixel (image element) may be provided with a row and a column select switch, such that a pixel-individual readout may be achieved. Alternatively, group select switches may be used if a predetermined correlation between neighboring pixels is assumed.

The concepts of the present disclosure may further be combined with event driven techniques (e.g. bus arbitration), without limiting the present disclosure in that regard.

Some embodiments pertain to an image element including: a photosensitive element; and image element readout circuitry configured to: sense an amount of electric carriers in the photosensitive element, wherein the photosensitive element is configured to generate the electric carriers in response to light being incident on the photosensitive element; and read the electric carriers from the photosensitive element when the amount of electric carriers reached a predetermined value, as discussed herein.

In some embodiments, the amount of electric carriers in the photosensitive element is sensed based on capacitive sensing, as discussed herein. In some embodiments, the image element readout circuitry is further configured to: capacitively sense a voltage change in the photosensitive element which is indicative of the amount of electric carriers in the photosensitive element, as discussed herein. In some embodiments, the amount of electric carriers is further sensed by capacitively sensing a voltage with respect to a reference voltage, as discussed herein. In some embodiments, the amount of electric carriers is further sensed based on a capacitive coupling between a transfer gate and the photosensitive element, as discussed herein. In some embodiments, the amount of electric carriers is further sensed based on a capacitive coupling between a pinning layer and the photosensitive element, as discussed herein. In some embodiments, the amount of electric carriers is sensed based on threshold voltage modulation sensing, as discussed herein. In some embodiments, the electric carriers are read from the photosensitive element based on correlated double sampling.

Some embodiments pertain to an image element readout method including: sensing an amount of electric carriers in a photosensitive element, wherein the photosensitive element is configured to generate the electric carriers in response to light being incident on the photosensitive element; and reading the electric carriers from the photosensitive element when the amount of electric carriers has reached a predetermined value, as discussed herein.

The image element readout method may be carried out with image element readout circuitry according to the present disclosure.

In some embodiments, the image element readout method further includes: capacitively sensing a voltage change in the photosensitive element which is indicative of the amount of electric carriers in the photosensitive element, as discussed herein. In some embodiments, the amount of electric carriers is sensed based on threshold voltage modulation sensing, as discussed herein. In some embodiments, the electric carriers are read from the photosensitive element based on correlated double sampling, as discussed herein.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

Returning to FIG. 2, there is depicted an image element 20 according to the present disclosure in a circuit diagram.

The image element 20 includes a photodiode 21. Symbolically, for depicting a parasitic capacitance which is present with respect to the photodiode, a capacitor 22 is depicted which is coupled to a sensing circuit 23 (also referred to as a non-destructive photodiode sensing circuit).

However, as discussed herein, a parasitic capacitance may be present due to the charged elements, such that the capacitor 22 is not provided, in some embodiments, and it is therefore depicted in dashed lines. This also applies to the upcoming FIGS. 3, 6, 7, and 8 symbolically depicting capacitors 38, 66, 71, and 82 for illustrating the presence of a capacitance without providing a capacitor.

Returning to FIG. 2: The sensing circuit 23 is configured to sense an amount of electric carriers in the photodiode 21 by sensing or determining a parasitic capacitance voltage drop between the photodiode 21 and a further element which is not specified herein, but which will be discussed in the following figures.

The image element 20 further includes selection circuitry 24, such that the photodiode can be read when it is sensed that the amount of electric carriers has reached a predetermined value.

The selection circuitry includes a transfer gate switch 25 which is coupled to the photodiode 21. The transfer gate switch 25 is further coupled to a reset gate switch 26 and to a source follower SF 27.

The transistor SF 27 is further coupled to a column select switch 28 with one pin and with another pin to a row select switch 29.

In this embodiment, the image element readout circuitry includes the sensing circuit 23 and the selection circuitry 24.

A capture sequence may be carried out as follows (which will be described in pseudo-code):

I) Reset photodiode 21 based on a pulsing of the transfer gate switch 25 and the reset gate switch 26;
II) Set i to zero;
III) Integrate light;
IV) Increment i;
V) Sense photodiode 21 non-destructively;
VI) If photodiode signal>threshold;
VII) Then goto IX);
VIII) Else goto III);
IX) CDS readout photodiode 21;
X) Linearize pixel value by dividing by i.

Figure 3:
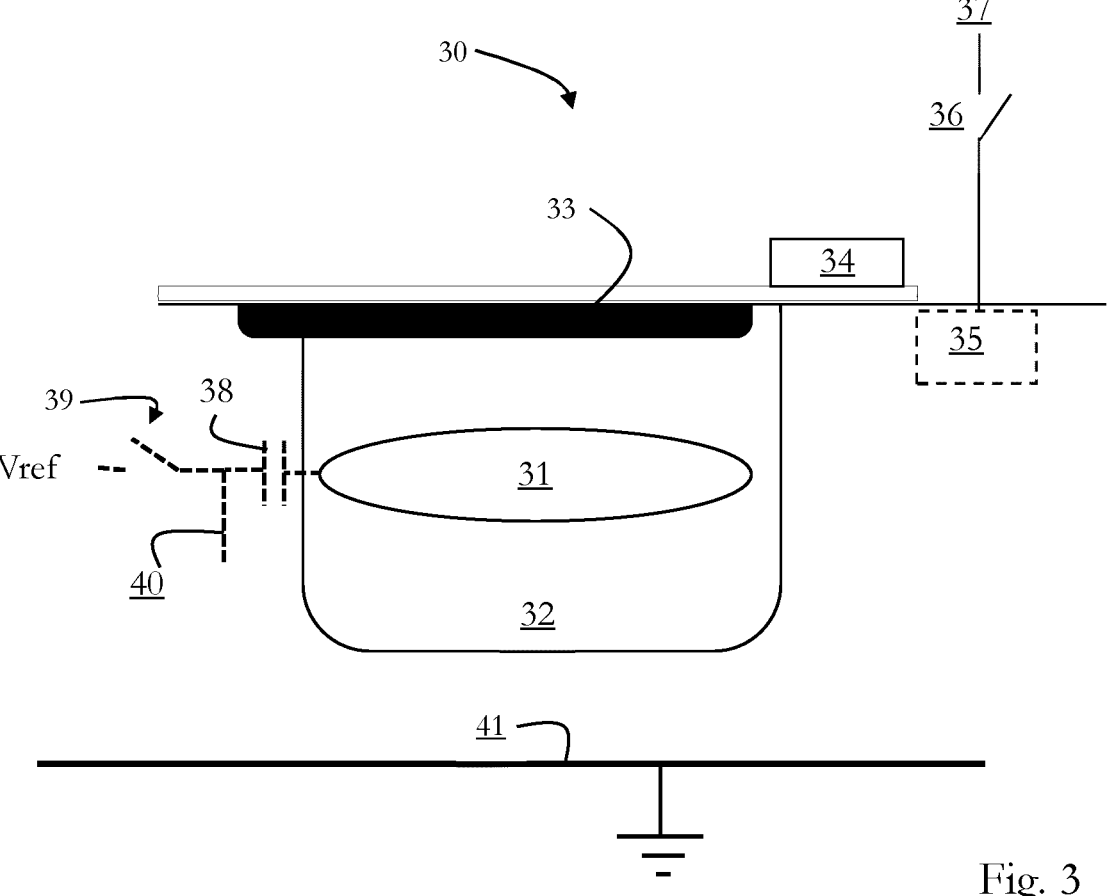
FIG. 3 depicts a schematic diagram of a further embodiment of an image element according to the present disclosure including image element readout circuitry according to the present disclosure, wherein a parasitic capacitance between a photodiode and a reference voltage is used to sense a voltage change in the photodiode.

FIG. 3 depicts an image element including image element 30 readout circuitry according to the present disclosure.

The image element 30 includes a photodiode 31 which is embedded in an N-well of a semiconductor material 32. The image element 30 further includes a pinning layer 33, a transfer gate 34, and a floating diffusion 35. The floating diffusion 35 is further coupled with a reset switch 36 which is coupled to a supply voltage VDD 37.

Between the photodiode 31 and a reference voltage VREF (which may be ground, in some embodiments), a symbolic capacitor 38 is depicted for illustrating the presence of a parasitic capacitance. Moreover, a sensing switch 39 is provided between ground GND (optionally VREF) and a sense node 40 for determining the parasitic capacitance voltage drop caused by accumulation of negatively charged photo-electrons, as discussed herein. The image element 30 is provided on a p-sup layer 41, as it is generally known.

The image element 30 can be operated with an image element readout method 50, as will be discussed in the following under reference of FIGS. 4 and 5.

Figure 4:
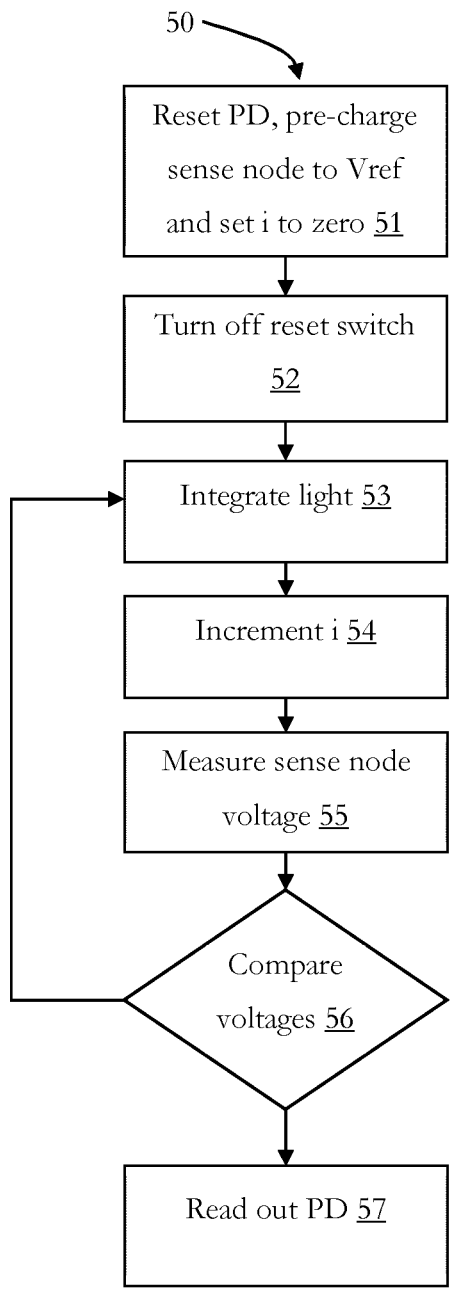
FIG. 4 depicts a flow-chart of an embodiment of an image element readout method according to the present disclosure.

FIG. 4 depicts a flow-chart of the image element readout method 50 which is similar to the pseudo-code given above. Generally, the pseudo-code given above or the image element readout method 50 may be applied to all embodiments of the present disclosure and is not limited to the embodiments of FIGS. 2 and 3.

At 51, the photodiode 31 is reset, the sense node 40 is pre-set to Vref and an iteration value i is set to zero.

At 52, the reset switch 36 is turned off (i.e. disconnected), such that the sense node 40 is made floating (i.e. has a high impedance).

At 53, light (signal) is integrated, such that the iteration i is incremented, at 54.

At 55, a voltage (V_sense) at the sense node 40 is measured. The measured voltage is compared to a threshold voltage V_th, at 56. If V_sense is smaller or equal to V_th, the light is integrated again, at 53, and so on.

At 57, if V_sense is larger than V_th, the photodiode is read with CDS, as discussed herein. Moreover, the electric carriers are linearized based on the i-value (i.e. the measured signal is divided by the number of iterations), such that, in a case of multiple pixels or image elements, the light signal is roughly brought to the same level (in case, other image elements do not need as much or more iterations).

However, it is not necessary, in some embodiments, that Vth is reached at a maximum integration time (which may depend on a sensor frame rate). In such a case, the image element may be read by "regular" CDS.

Figure 5:
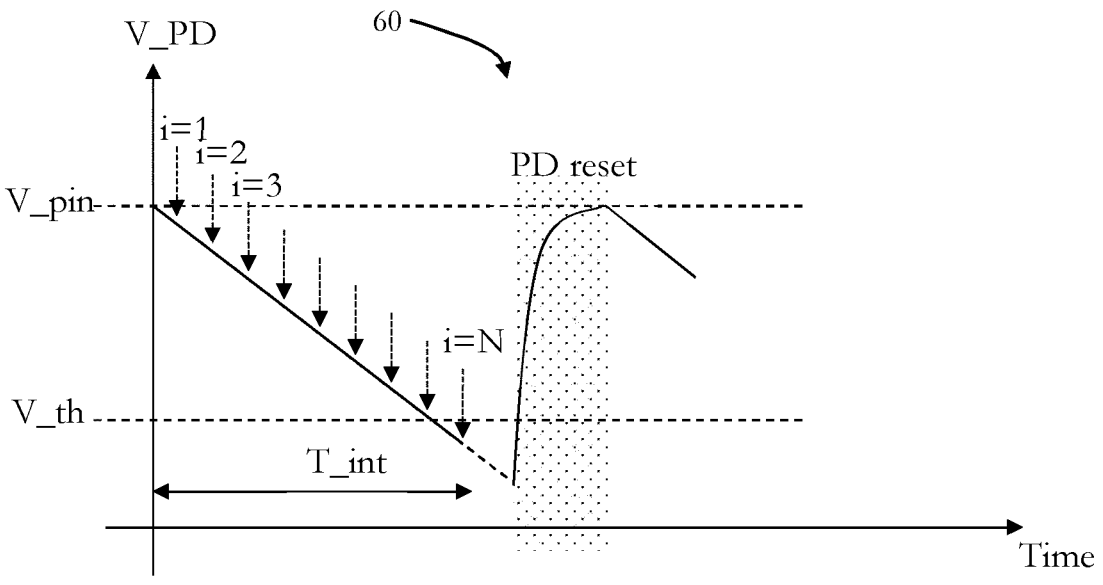
FIG. 5 is a diagram for illustrating a sensing in the image element readout method of FIG. 4.

FIG. 5 depicts a diagram 60 for illustrating the sensing according to the present disclosure.

On an ordinate of the diagram 60, a voltage of the photodiode V_PD is depicted versus a time on an abscissa.

Moreover, iterations i are depicted at which a voltage V_pin (or V_sense) on the sense node is determined. At a beginning of the acquisition, V_pin is set to GND, as discussed herein. It should be noted that, if V_sense is measured, it may be shifted down an absolute value, i.e. may start at GND instead of V_pin.

After an $N^{th}$ integration, it is determined that the measured voltage V_PD has reached a value below the threshold value V_th, such that the photodiode is read. When the photodiode has been read, the photodiode is reset, as discussed herein. The measurement time, after the $N^{th}$ has been carried out is named T_int (integration time), such that the photodiode is read before a saturation is reached.

Figure 6:
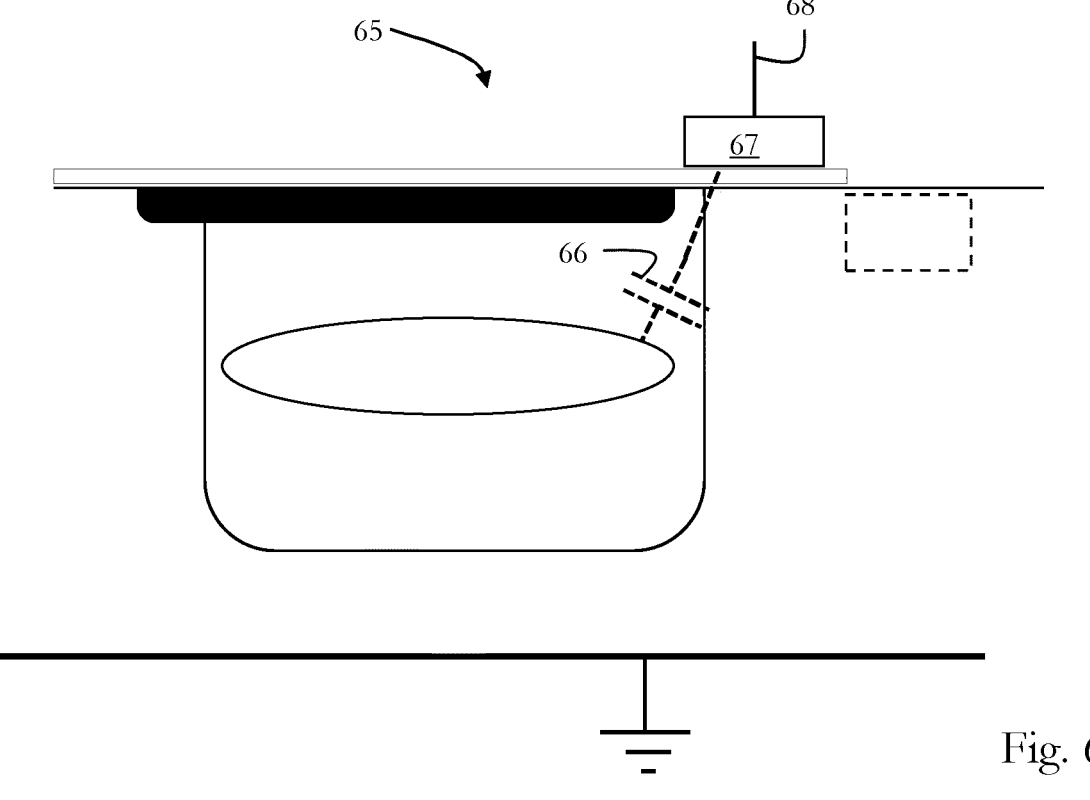
FIG. 6 depicts a further embodiment of an image element including image element readout circuitry according to the present disclosure in which a parasitic capacitance between a photodiode and a transfer gate is used to sense a voltage change in the photodiode.

FIG. 6 depicts a further embodiment of an image element 65 according to the present disclosure in which a parasitic capacitance between a photodiode and a transfer gate is determined.

The image element 65 is different from the image element 30 in that a parasitic capacitance 66 is present between the photodiode and the transfer gate 67 instead of ground. Hence, a corresponding sensing circuit 68 is coupled to the transfer gate 67, such that a respective parasitic capacitance can be used for sensing the amount of electric carriers in the photodiode, as discussed herein.

The remaining elements correspond to the image element 30, such that a repetitive description thereof is omitted.

An acquisition process or capture process for the image element 65 may be carried out according to the following pseudo-code:

I) Reset photodiode to V_pin based on pulsing of transfer gate;
II) Photodiode exposure phase;
  Transfer gate floating (but low enough to stay off),
  Photodiode accumulates electrons (QPD),
  Transfer gate drops by corresponding voltage,
III) Photodiode sense phase: Measure drop on transfer gate and compare with threshold.

Figure 7:
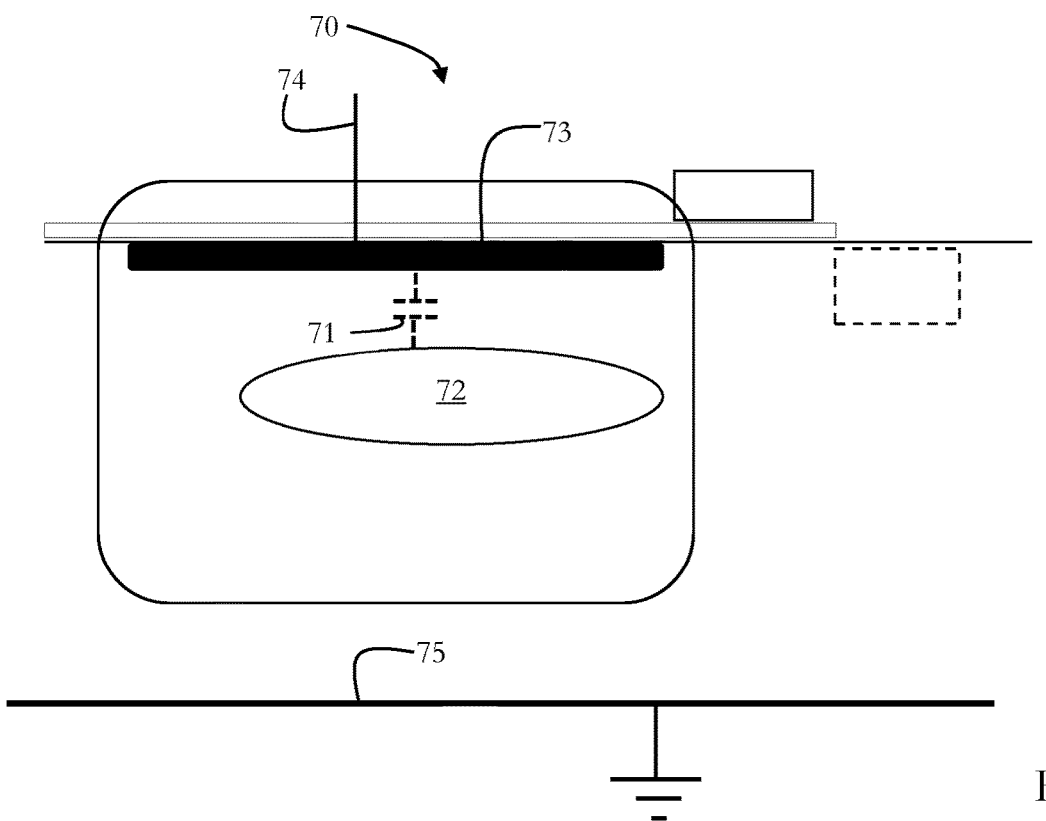
FIG. 7 depicts a further embodiment of an image element including image element readout circuitry according to the present disclosure in which a parasitic capacitance between a photodiode and a pinning layer is used to sense a voltage change in the photodiode.

FIG. 7 depicts a further embodiment of an image element 70 according to the present disclosure which is different than the image elements 30 and 65 in that a parasitic capacitance 71 is between the photodiode 72 and the pinning layer 73 is used. Accordingly, a sense circuit 74 is coupled to the pinning layer 73.

The remaining elements are similar as in the other image elements discussed herein, such that a repetitive description thereof is omitted.

An acquisition process or capture process for the image element 70 may be carried out according to the following pseudo-code:

I) Photodiode reset phase;
  Set photodiode 72 to V_pin;
  Set parasitic capacitance 71 based on photodiode voltage (i.e. to V_pin);
  Pre-charge P+ layer 75 to GND;
II) Photodiode exposure phase;
  P+ layer floating;
  Photodiode accumulated electrons (QPD);
  P+ layer drops by corresponding voltage;
III) Photodiode sense phase: Measure drop on P+ layer and compare to threshold.

Figure 8:
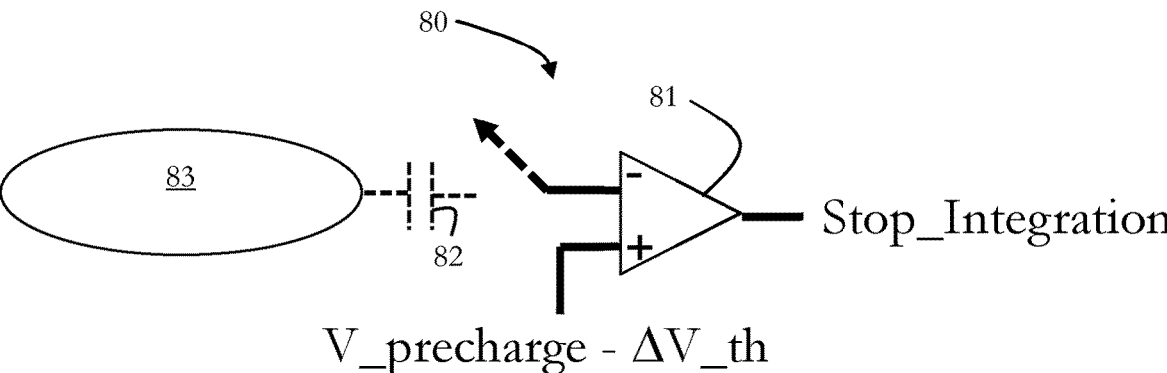
FIG. 8 depicts an embodiment of a sensing circuit which utilizes CDS for reading charges according to the present disclosure.

FIG. 8 depicts an embodiment of a sensing circuit 80 which utilizes CDS (as an embodiment of image element readout circuitry according to the present disclosure) in a block diagram.

The sensing circuit 80 includes a comparator 81 which compares a pre-charge voltage V_precharge with a threshold voltage V_th, such that a parasitic capacitance with respect to a photodiode 83 is used. When a difference between V_precharge and V_th reaches a predetermined value, an integration is stopped and the photodiode 83 is read out.

Figure 9:
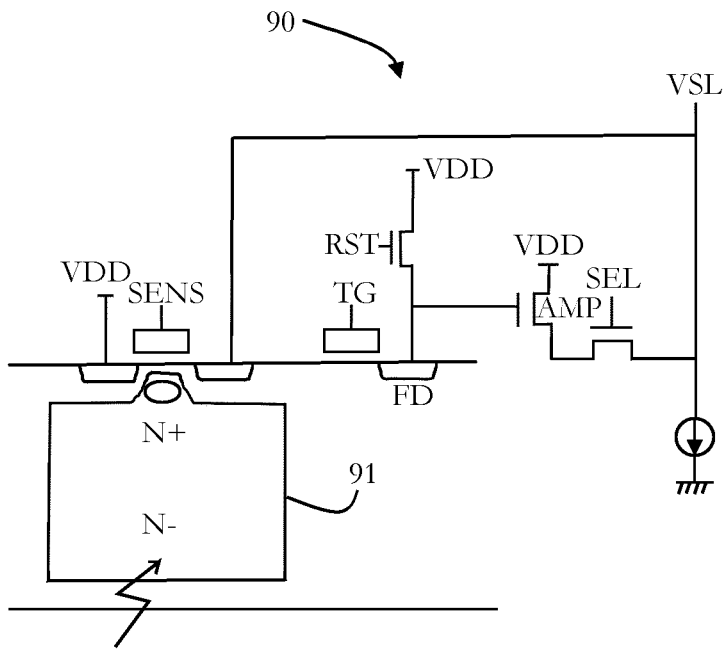
FIG. 9 depicts a circuit diagram of a further embodiment of image element readout circuitry according to the present disclosure which utilized Vth modulation sensing.

FIG. 9 depicts a further embodiment of image element readout circuitry 90 according to the present disclosure for reading out a photosensitive element 91 based on Vth modulation sensing, as discussed herein.

A sensing circuit SENS is provided next to the photosensitive element 91, which is supplied with a supply voltage VDD, which is coupled to a first floating diffusion node FD. A second floating diffusion node FD is coupled with a signal line voltage VSL which is coupled ground, via a diode. Moreover, the second floating diffusion node FD is coupled with a third floating diffusion node FD, which is coupled with a reset transistor, wherein the reset transistor is supplied with VDD. Moreover, the third floating diffusion is coupled with an amplification transistor AMP (which is supplied with VDD), wherein the amplification transistor AMP is further coupled with a selection transistor SEL, which is coupled with the diode. A transfer gate TG is further provided between SENS and the third floating diffusion.

Figure 10:
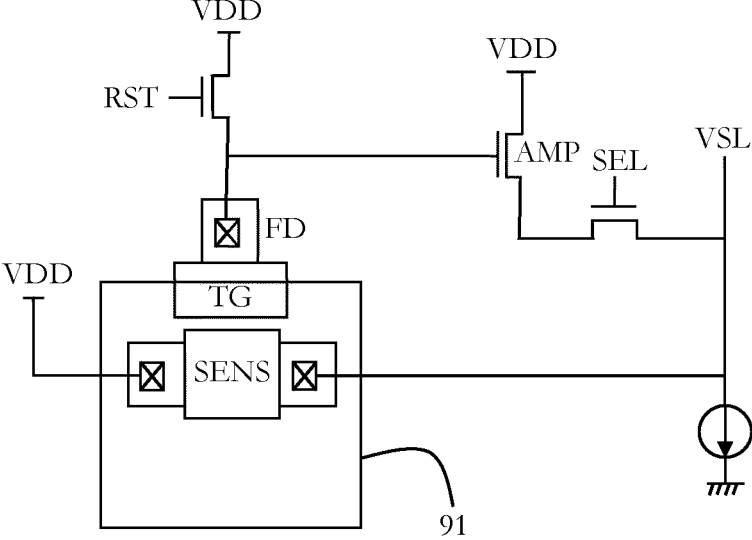
FIG. 10 depicts a plane view of the image element readout circuitry of FIG. 9.

FIG. 10 depicts plane view of the image element readout circuitry 90, such that it is shown that the sensing circuit SENS is provided on top of the photosensitive element 91 and the photodiode 91 is coupled to the floating diffusion FD via the transfer gate TG. The remaining elements correspond to the elements as discussed under reference of FIG. 9 and a repetitive description thereof if omitted.

Figure 11:
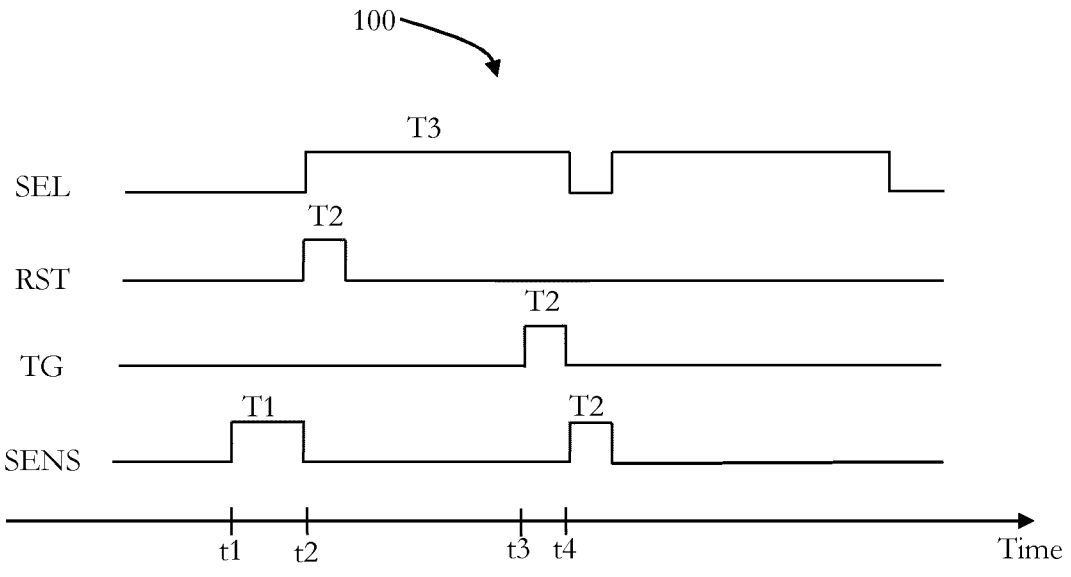
FIG. 11 depicts a timing diagram according to which control signals are applied to the image element readout circuitry of FIGS. 9 and 10.

FIG. 11 depicts a timing diagram 100 according to which control signals are applied to the image element readout circuitry 90. A sense signal is applied to the sensing circuit SENS at a first point of time t1 for a first time duration T1 as a non-destructive signal.

According to the embodiment described under reference of FIGS. 9 to 11, an electrical reliability of non-destructive sensing is provided, wherein a coupling between the photodiode and the sensing circuit is optimized.

At a second point of time t2 (which is when T1 is over), which lies after t1, a reset signal is applied to RST for a duration T2 and a selection signal is applied to SEL for a duration T3.

Roughly in the middle of T3, a reset level is reached. In a last section of T3, a point of time t3 is reached in which a pulse is applied to the transfer gate for roughly the duration T2.

If a reset is needed, at a time point t4, which lies after T3 is over, a pulse for the duration T2 is applied to SENS, after which, for the duration T3 again, a signal is applied to SEL for reaching a signal level.

At the end of such a readout sequence, a negative bias exists between TG and SENS.

Figure 12:
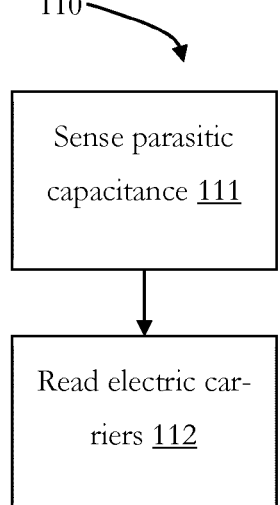
FIG. 12 depicts a further embodiment of an image element readout method according to the present disclosure which utilizes capacitive sensing.

FIG. 12 depicts a further embodiment of an image element readout method 110 according to the present disclosure.

At 111, a voltage change in the photosensitive element is capacitively sensed, which is indicative of the amount of electric carriers in the photosensitive element, as discussed herein.

At 112, the electric carriers are read from the photosensitive element based on CDS, as discussed herein.

Figure 13:
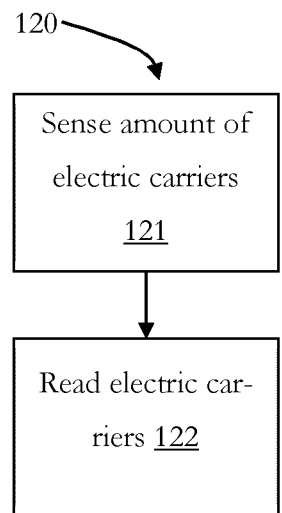
FIG. 13 depicts a further embodiment of an image element readout method according to the present disclosure which utilized Vth modulation sensing.

FIG. 13 depicts a further embodiment of an image element readout method 120 according to the present disclosure.

At 121, an amount of electric carriers in a photosensitive element is sensed based on Vth modulation sensing, as discussed herein.

At 122, the electric carriers are read from the photosensitive element based on CDS, as discussed herein.

Figure 14:
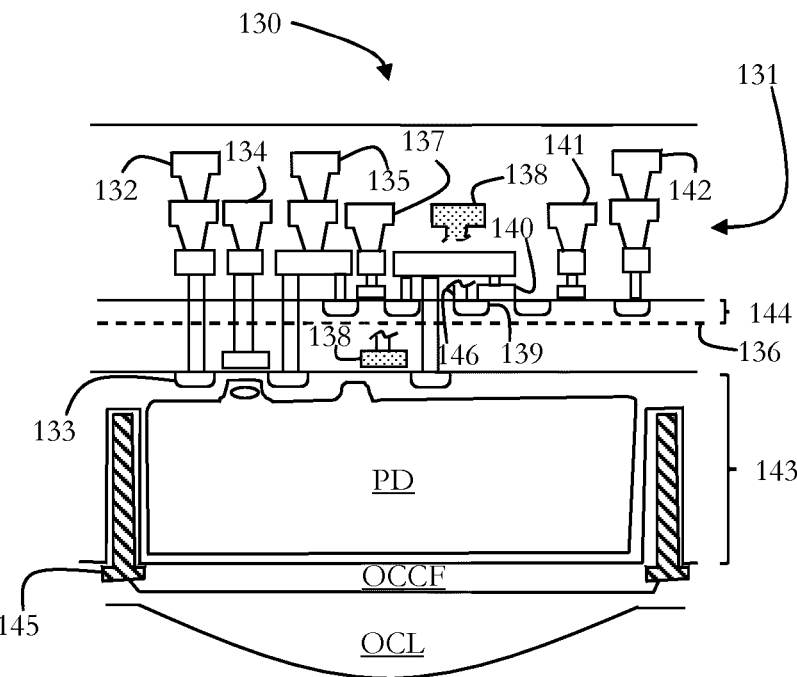
FIG. 14 is a cross-sectional illustration of a semiconductor device according to the present disclosure.

FIG. 14 is a cross-sectional illustration of a semiconductor device 130 according to the present disclosure.

The semiconductor device 130 includes a photodiode PD which is provided between an on-chip color filter OCCF (on which an on-chip lens OCL is provided) and readout circuitry 131 according to the present disclosure.

The readout circuitry 131 includes a vertical signal line VSL 132 which is connected to a floating diffusion 133. Next to the vertical signal line 132, a sense circuit node 134 is provided which is adapted to capacitively sense electric carriers in the photodiode PD, as discussed herein. Moreover, a reference voltage VDD node 135 is provided next to the sense circuit node 134 which is connected to a further floating diffusion below a substrate boundary 136 and to a further floating diffusion above the substrate boundary 136.

Next to the reference voltage VDD node 135, a reset transistor RST 137 is provided, as discussed above, and a transfer gate 138 is provided next to the reset transistor. Roughly below the transfer gate 138, a floating diffusion 139. Moreover, a connection 146 is provided above the floating diffusion 139, to which the reference voltage VDD is connected. The floating diffusion is further connected with an amplifier 140. The transfer gate 138 extends into the first silicon substrate 143, which is indicated by a same hatching.

Next to the transfer gate, a selection transistor SEL 141 is provided and next to the selection transistor SEL 141, a further vertical signal line VSL 142 is provided which is connected with a floating diffusion above the substrate boundary 136.

The photodiode PD is provided in a first silicon substrate 143 and the readout circuitry is provided on a second silicon substrate 144 and partly extending through the second silicon substrate 144 with respective connection conductors. Floating diffusions are provided in the respective silicon substrates, i.e. floating diffusions above the substrate boundary 136 are provided in the second silicon 144 substrate and floating diffusions below the substrate boundary 136 are provided in the first silicon substrate 143, or the like.

Moreover, left and right of the photodiode, in the first semiconductor substrate 143, RDTIs (rear deep trench isolations) 145 are provided, wherein such RDTIs may also be applied in other embodiments.

Figure 15:
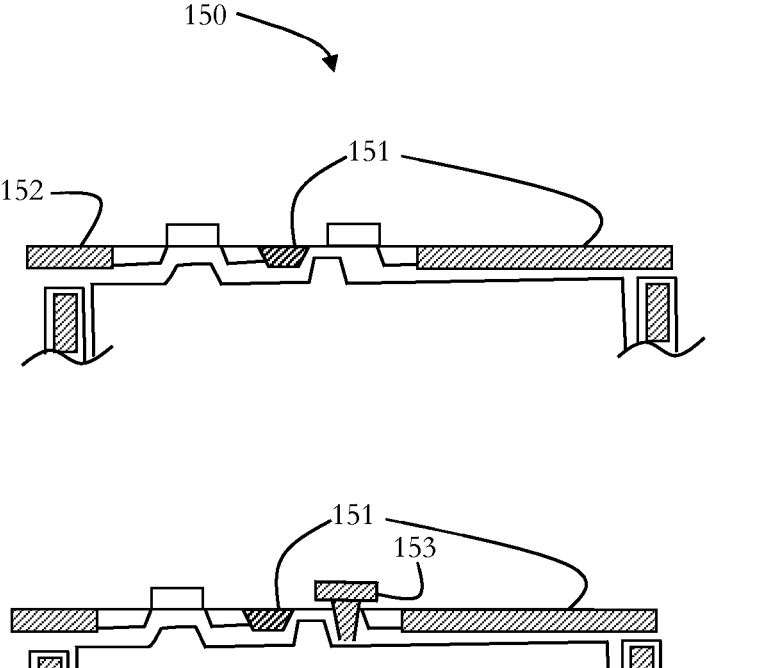
FIG. 15 depicts two embodiments of semiconductor devices according to the present disclosure.

FIG. 15 depicts a further embodiment of a (part of) a semiconductor device 150 according to the present disclosure in two different perspectives. On top, a view is shown in which a shallow trench isolation 151 is provided next to an $SiO_2$ insulating portion 152.

On the bottom, it is shown that a vertical transfer 153 gate is provided between the shallow trench isolations, such that a voltage can be sensed based on capacitive sensing between the vertical transfer gate and the photodiode (not depicted).

Generally, STIs (shallow trench isolations) and VTGs (vertical transfer gates) may be applied separately or together in the embodiments of the present disclosure.

The technology according to an embodiment of the present disclosure is applicable to various products. For example, the technology according to an embodiment of the present disclosure may be implemented as a device included in a mobile body that is any of kinds of automobiles, electric vehicles, hybrid electric vehicles, motorcycles, bicycles, personal mobility vehicles, airplanes, drones, ships, robots, construction machinery, agricultural machinery (tractors), and the like.

Figure 16:
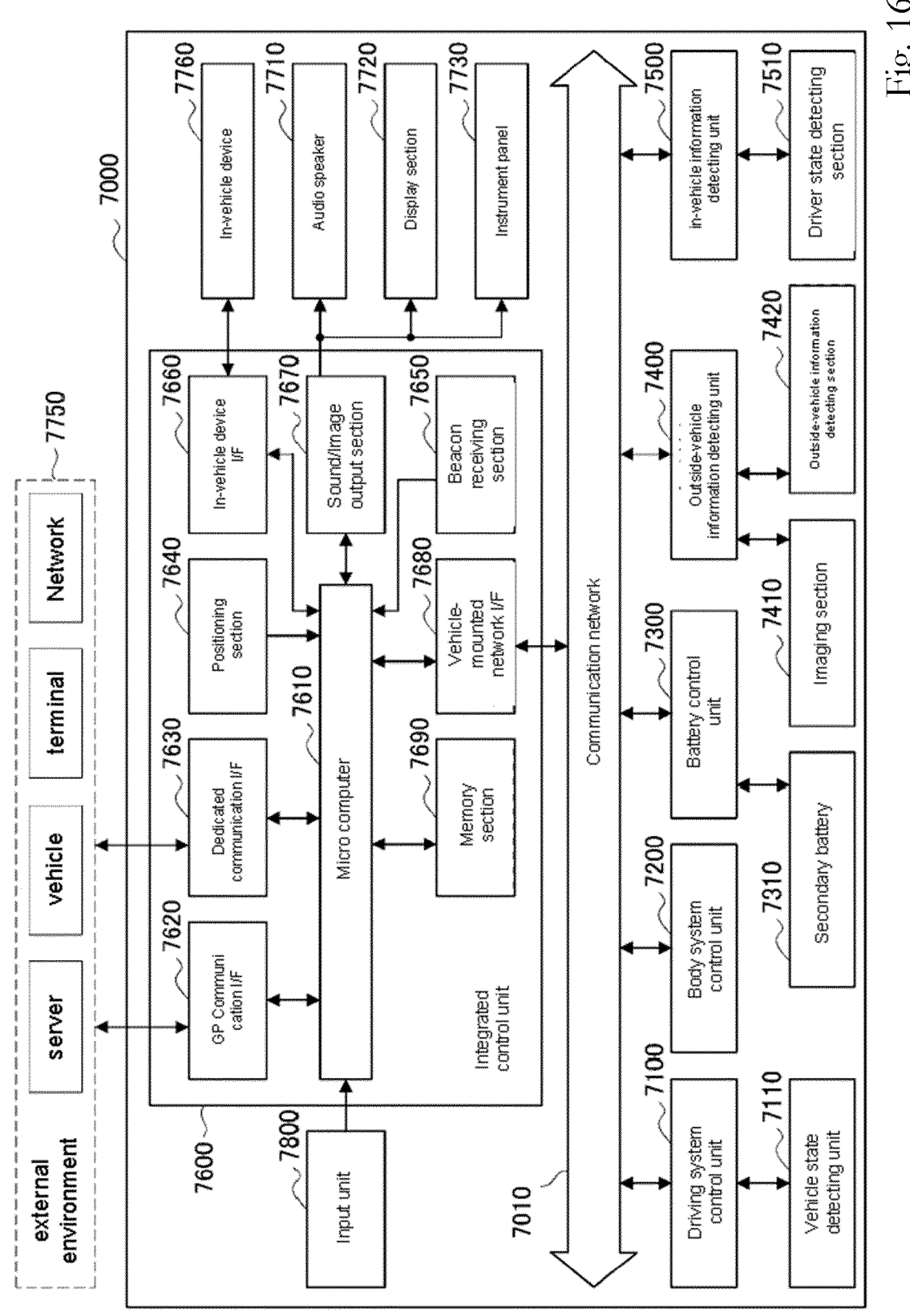
FIG. 16 is a block diagram depicting an example of schematic configuration of a vehicle control system.

FIG. 16 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 16, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay (registered trademark), or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 16 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

Figure 17:
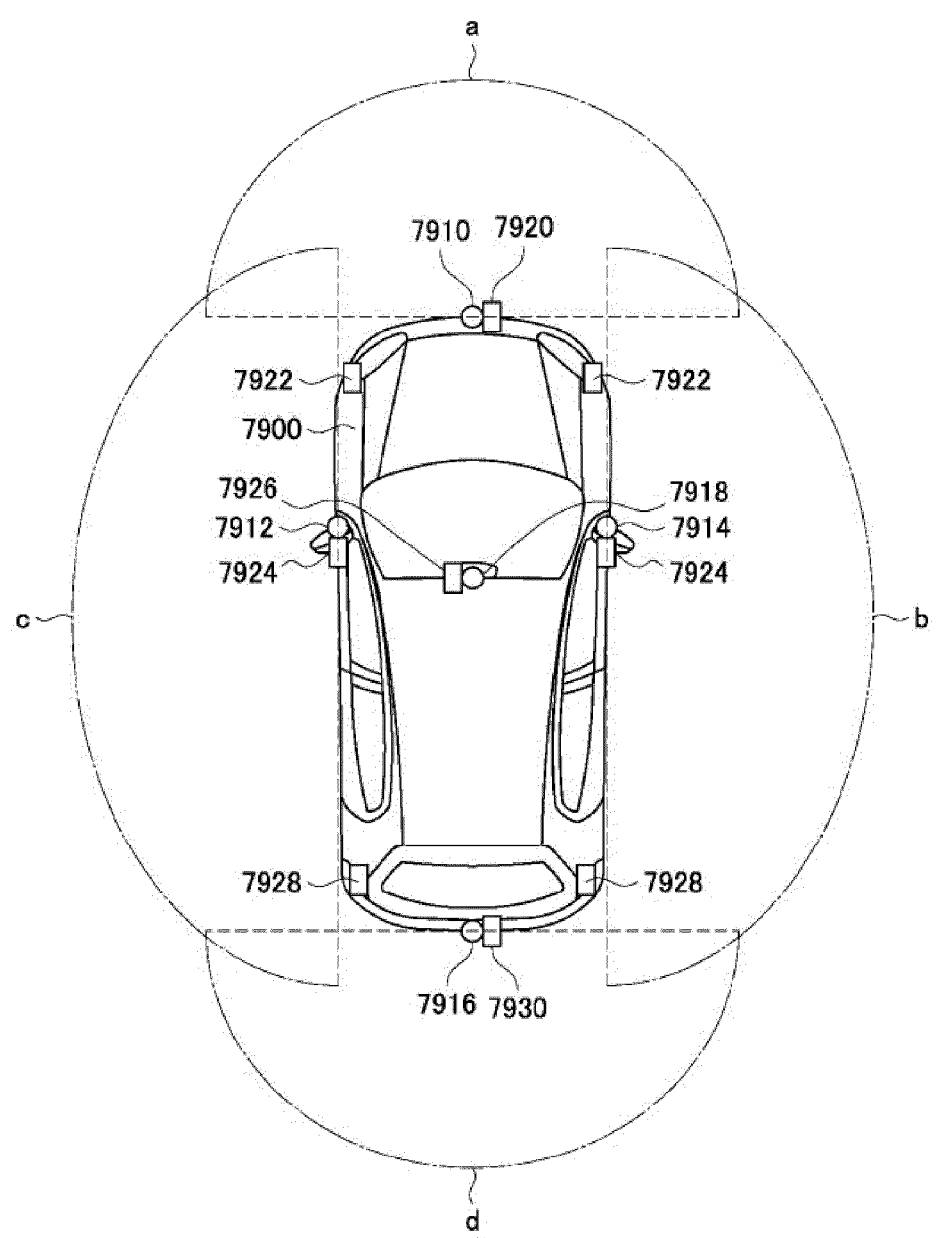
FIG. 17 is a diagram of assistance in explaining an example of installation positions of an outside-vehicle information detecting section and an imaging section.

FIG. 17 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 17 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 16, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM (registered trademark)), worldwide interoperability for microwave access (WiMAX (registered trademark)), long term evolution (LTE (registered trademark)), LTE-advanced (LTE-A), or the like, or another wireless communication protocol such as wireless LAN (referred to also as wireless fidelity (Wi-Fi (registered trademark)), Bluetooth (registered trademark), or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth (registered trademark), near field communication (NFC), or wireless universal serial bus (WUSB). In addition, the in-vehicle device I/F 7660 may establish wired connection by universal serial bus (USB), high-definition multimedia interface (HDMI (registered trademark)), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 16, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 16 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

Incidentally, a computer program for realizing the functions of image element readout circuitry according to the present disclosure can be implemented in one of the control units or the like. In addition, a computer readable recording medium storing such a computer program can also be provided. The recording medium is, for example, a magnetic disk, an optical disk, a magneto-optical disk, a flash memory, or the like. In addition, the above-described computer program may be distributed via a network, for example, without the recording medium being used.

In the vehicle control system 7000 described above, image element readout circuitry according to the present disclosure can be applied to the integrated control unit 7600 in the application example depicted in FIG. 16.

In addition, at least part of the image element readout circuitry according to the present disclosure may be implemented in a module (for example, an integrated circuit module formed with a single die) for the integrated control unit 7600 depicted in FIG. 16. Alternatively, image element readout circuitry according to the present disclosure may be implemented by a plurality of control units of the vehicle control system 7000 depicted in FIG. 16.

It should be recognized that the embodiments describe methods with an exemplary ordering of method steps. The specific ordering of method steps is however given for illustrative purposes only and should not be construed as binding. For example the ordering of 53 and 54 in the embodiment of FIG. 4 may be exchanged. Other changes of the ordering of method steps may be apparent to the skilled person.

In some embodiments, also a non-transitory computer-readable recording medium is provided that stores therein a computer program product, which, when executed by a processor, such as the processor described above, causes the methods described to be performed.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) Image element readout circuitry configured to:
    sense an amount of electric carriers in a photosensitive element, wherein the photosensitive element is configured to generate the electric carriers in response to light being incident on the photosensitive element; and
    read the electric carriers from the photosensitive element when the amount of electric carriers has reached a predetermined value.

(2) The image element readout circuitry of (1), wherein the amount of electric carriers in the photosensitive element is sensed based on capacitive sensing.

(3) The image element readout circuitry of (2), further configured to:

capacitively sense a voltage change in the photosensitive element which is indicative of the amount of electric carriers in the photosensitive element.

(4) The image element readout circuitry of (2) or (3), wherein the amount of electric carriers is further sensed by capacitively sensing a voltage with respect to a reference voltage.

(5) The image element readout circuitry of (2) or (3), wherein the amount of electric carriers is further sensed based on a capacitive coupling between a transfer gate and the photosensitive element.

(6) The image element readout circuitry (2) or (3), wherein the amount of electric carriers is further sensed based on a capacitive coupling between a pinning layer and the photosensitive element.

(7) The image element readout circuitry (1), wherein the amount of electric carriers is sensed based on threshold voltage modulation sensing.

(8) The image element readout circuitry of anyone of (1) to (7), wherein the electric carriers are read from the photosensitive element based on correlated double sampling.

(9) An image element comprising:

a photosensitive element; and image element readout circuitry configured to:

sense an amount of electric carriers in the photosensitive element, wherein the photosensitive element is configured to generate the electric carriers in response to light being incident on the photosensitive element; and read the electric carriers from the photosensitive element when the amount of electric carriers reached a predetermined value.

(10) The image element of (9), wherein the amount of electric carriers in the photosensitive element is sensed based on capacitive sensing.

(11) The image element of (10), wherein the image element readout circuitry is further configured to:

capacitively sense a voltage change in to the photosensitive element which is indicative of the amount of electric carriers in the photosensitive element.

(12) The image element of (10) or (11), wherein the amount of electric carriers is further sensed by capacitively sensing a voltage with respect to a reference voltage.

(13) The image element of (10) or (11), wherein the amount of electric carriers is further sensed based on a capacitive coupling between a transfer gate and the photosensitive element.

(14) The image element of (10) or (11), wherein the amount of electric carriers is further sensed based on a capacitive coupling between a pinning layer and the photosensitive element.

(15) The image element of (9), wherein the amount of electric carriers is sensed based on threshold voltage modulation sensing.

(16) The image element of anyone of (9) to (15), wherein the electric carriers are read from the photosensitive element based on correlated double sampling.

(17) An image element readout method comprising:

sensing an amount of electric carriers in a photosensitive element, wherein the photosensitive element is configured to generate the electric carriers in response to light being incident on the photosensitive element; and reading the electric carriers from the photosensitive element when the amount of electric carriers has reached a predetermined value.

(18) The image element readout method of (17), further comprising:

capacitively sensing a voltage change in the photosensitive element which is indicative of the amount of electric carriers in the photosensitive element.

(19) The image element readout method of (17), wherein the amount of electric carriers is sensed based on threshold voltage modulation sensing.

(20) The image element readout method of anyone of (17) to (19), wherein the electric carriers are read from the photosensitive element based on correlated double sampling.

The invention claimed is:

1. An image element readout circuitry configured to:

sense an amount of electric carriers in a photosensitive element, wherein the photosensitive element is configured to generate the electric carriers in response to light being incident on the photosensitive element; and read the electric carriers from the photosensitive element when the amount of electric carriers has reached a predetermined value, wherein the amount of electric carriers is capacitively sensed based on a capacitive coupling between the photosensitive element and an internal pixel element including at least one of a shallow trench isolation (STI) structure or a vertical transfer gate (VTG) structure, or the amount of electric carriers is sensed based on threshold voltage modulation sensing using a sensing circuit including the at least one of the STI structure or the VTG structure.

2. The image element readout circuitry of claim 1, further configured to:

capacitively sense a voltage change in the photosensitive element which is indicative of the amount of electric carriers in the photosensitive element.

3. The image element readout circuitry of claim 1, wherein;

the amount of electric carriers is further sensed by capacitively sensing a voltage with respect to a reference voltage.

4. The image element readout circuitry of claim 1, wherein;

the amount of electric carriers is further sensed based on the capacitive coupling between the internal pixel element including a transfer gate and the photosensitive element.

5. The image element readout circuitry of claim 1, wherein;

the amount of electric carriers is further sensed based on the capacitive coupling between the internal pixel element including a pinning layer and the photosensitive element.

6. The image element readout circuitry of claim 1, wherein:

the electric carriers are read from the photosensitive element based on correlated double sampling.

7. The image element readout circuitry of claim 1, wherein:

the internal pixel element corresponds to at least one of a reference voltage node, ground, a pinning layer, or a transfer gate.

8. The image element readout circuitry of claim 7, wherein:

the internal pixel element corresponds to the pinning layer.

9. The image element readout circuitry of claim 1, wherein:

the internal pixel element includes the STI structure and the VTG structure.

10. The image element readout circuitry of claim 1, further comprising:

the sensing circuit;

a transfer gate coupled between the photosensitive element and a floating diffusion node;

a reset terminal coupled to the floating diffusion node;

an amplifier transistor having a gate coupled to the floating diffusion node; and a selection transistor, wherein the sensing circuit is configured to use an adaptive sensing voltage for sensing the electric carriers, such that applied voltage of the sensing circuit changes with respect to the electric carriers being present in the photosensitive element, thereby resulting in the threshold voltage modulation sensing which is translated into a corresponding photodiode charge.

11. An image element comprising:

a photosensitive element; and image element readout circuitry configured to:

sense an amount of electric carriers in the photosensitive element, wherein the photosensitive element is configured to generate the electric carriers in response to light being incident on the photosensitive element; and read the electric carriers from the photosensitive element when the amount of electric carriers reached a predetermined value, wherein the amount of electric carriers is capacitively sensed based on a capacitive coupling between the photosensitive element and an internal pixel element including at least one of a shallow trench isolation (STI) structure or a vertical transfer gate (VTG) structure, or the amount of electric carriers is sensed based on threshold voltage modulation sensing using a sensing circuit including the at least one of the STI structure or the VTG structure.

12. The image element of claim 11, wherein the image element readout circuitry is further configured to:

capacitively sense a voltage change in the photosensitive element which is indicative of the amount of electric carriers in the photosensitive element.

13. The image element of claim 11, wherein:

the amount of electric carriers is further sensed by capacitively sensing a voltage with respect to a reference voltage.

14. The image element of claim 11, wherein;

the amount of electric carriers is further sensed based on the capacitive coupling between the internal pixel element including a transfer gate and the photosensitive element.

15. The image element of claim 11, wherein:

the amount of electric carriers is further sensed based on the capacitive coupling between the internal pixel element including a pinning layer and the photosensitive element.

16. The image element of claim 11, wherein:

the electric carriers are read from the photosensitive element based on correlated double sampling.

17. The image element of claim 11, wherein:

the internal pixel element corresponds to a pinning layer.

18. An image element readout method comprising:

sensing an amount of electric carriers in a photosensitive element, wherein the photosensitive element is configured to generate the electric carriers in response to light being incident on the photosensitive element; and reading the electric carriers from the photosensitive element when the amount of electric carriers has reached a predetermined value, wherein the amount of electric carriers is capacitively sensed based on a capacitive coupling between the photosensitive element and an internal pixel element including at least one of a shallow trench isolation (STI) structure or a vertical transfer gate (VTG) structure, or the amount of electric carriers is sensed based on threshold voltage modulation sensing using a sensing circuit including the at least one of the STI structure or the VTG structure.

19. The image element readout method of claim 18, further comprising:

capacitively sensing a voltage change in the photosensitive element which is indicative of the amount of electric carriers in the photosensitive element.

20. The image element readout method of claim 18, wherein:

the electric carriers are read from the photosensitive element based on correlated double sampling.

* * * * *